(12) United States Patent
Gao et al.

(10) Patent No.: US 9,514,344 B2
(45) Date of Patent: Dec. 6, 2016

(54) ADAPTIVE DATA READER AND METHOD OF OPERATING

(75) Inventors: WenLiang Gao, Eugene, OR (US); Alan J. Guess, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 24 days.

(21) Appl. No.: 13/293,982

(22) Filed: Nov. 10, 2011

(65) Prior Publication Data
US 2012/0111944 A1 May 10, 2012

Related U.S. Application Data

(60) Provisional application No. 61/412,196, filed on Nov. 10, 2010.

(51) Int. Cl.
G06K 7/10 (2006.01)
G06K 7/14 (2006.01)
G06K 9/20 (2006.01)

(52) U.S. Cl.
CPC ....... *G06K 7/10861* (2013.01); *G06K 7/10752* (2013.01); *G06K 7/1443* (2013.01); *G06K 9/2036* (2013.01)

(58) Field of Classification Search
CPC .... G03B 7/00; G03B 15/00; G06K 7/10752; G06K 7/10861; G06K 7/1443; G06K 9/2036
USPC .............. 235/462.01, 462.06, 462.1, 462.25, 235/901; 396/63, 65, 89
See application file for complete search history.

(56) References Cited

U.S. PATENT DOCUMENTS

| 4,578,571 | A | * | 3/1986 | Williams | ................. 235/462.25 |
|---|---|---|---|---|---|
| 5,250,791 | A | | 10/1993 | Heiman et al. | |
| 5,430,558 | A | | 7/1995 | Sohaei et al. | |
| 5,457,309 | A | | 10/1995 | Pelton | |
| 5,648,650 | A | * | 7/1997 | Sugifune | ............ G06K 7/10564 235/455 |
| 5,701,001 | A | * | 12/1997 | Sugifune et al. | ........ 235/462.42 |
| 5,793,031 | A | * | 8/1998 | Tani et al. | ................ 235/462.15 |
| 5,949,054 | A | * | 9/1999 | Karpen et al. | ........... 235/462.25 |
| 5,969,325 | A | * | 10/1999 | Hecht et al. | ............. 235/462.16 |

(Continued)

FOREIGN PATENT DOCUMENTS

| CN | 1178957 A | 4/1998 |
|---|---|---|
| CN | 101031930 A | 9/2007 |

(Continued)

OTHER PUBLICATIONS

International Search Report, PCT/US2011/060232, Apr. 27, 2012.

(Continued)

*Primary Examiner* — Daniel Walsh
(74) *Attorney, Agent, or Firm* — Stoel Rives LLP

(57) ABSTRACT

Systems and methods for data reading are disclosed wherein one or more images of an item bearing an optical code are captured and the captured images are analyzed to determine whether the item has a reflective surface or not. Based on such a determination, operating parameters of the system, such as one or more of: the amount of time dedicated to 1D code decoding and the amount of time dedicated to 2D code decoding, the order in which 1D code and 2D code decoding are performed, termination of a decoding operation, restarting an image capture and decoding operation, and image preprocessing may be automatically adjusted by the system to decode an optical code.

19 Claims, 6 Drawing Sheets

(56) References Cited

U.S. PATENT DOCUMENTS

| | | | |
|---|---|---|---|
| 6,230,975 B1* | 5/2001 | Colley et al. | 235/462.06 |
| 6,394,349 B1* | 5/2002 | Shigekusa | G06K 7/14 |
| | | | 235/454 |
| 6,561,427 B2 | 5/2003 | Davis et al. | |
| 6,749,120 B2* | 6/2004 | Hung et al. | 235/472.01 |
| 7,097,102 B2* | 8/2006 | Patel et al. | 235/454 |
| 7,119,932 B2 | 10/2006 | Sato et al. | |
| 7,148,923 B2* | 12/2006 | Harper et al. | 348/229.1 |
| 7,204,420 B2* | 4/2007 | Barkan et al. | 235/462.01 |
| 7,227,117 B1* | 6/2007 | Lackemann | G06K 7/10584 |
| | | | 235/462.26 |
| 7,262,892 B1 | 8/2007 | Yasuda et al. | |
| 7,308,375 B2 | 12/2007 | Jensen et al. | |
| 7,450,559 B2 | 11/2008 | Schotten et al. | |
| 7,984,854 B2 | 7/2011 | Nadabar | |
| 8,573,497 B2* | 11/2013 | Gao et al. | 235/455 |
| 8,622,299 B2* | 1/2014 | Crooks et al. | 235/454 |
| 2002/0008145 A1* | 1/2002 | Walsh | G06K 7/084 |
| | | | 235/462.46 |
| 2002/0039137 A1* | 4/2002 | Harper et al. | 348/207 |
| 2002/0070278 A1* | 6/2002 | Hung | G06K 7/10702 |
| | | | 235/472.01 |
| 2002/0084330 A1* | 7/2002 | Chiu | 235/462.11 |
| 2003/0085284 A1* | 5/2003 | Bremer | G06K 7/10554 |
| | | | 235/462.32 |
| 2003/0230630 A1 | 12/2003 | Whipple et al. | |
| 2004/0007621 A1 | 1/2004 | Okada | |
| 2004/0118928 A1* | 6/2004 | Patel et al. | 235/472.01 |
| 2004/0242267 A1* | 12/2004 | Walsh | G06K 7/084 |
| | | | 455/556.1 |
| 2005/0082370 A1 | 4/2005 | Frantz et al. | |
| 2005/0121520 A1* | 6/2005 | Yamaguchi | G06K 7/1452 |
| | | | 235/462.09 |
| 2005/0156047 A1* | 7/2005 | Chiba et al. | 235/472.01 |
| 2006/0011725 A1* | 1/2006 | Schnee | G06K 7/10722 |
| | | | 235/454 |
| 2006/0043194 A1* | 3/2006 | Barkan | G06K 7/10722 |
| | | | 235/462.45 |
| 2006/0118629 A1* | 6/2006 | Shiramizu et al. | 235/454 |
| 2006/0163355 A1* | 7/2006 | Olmstead et al. | 235/454 |
| 2007/0040034 A1 | 2/2007 | Hennick et al. | |
| 2007/0158428 A1* | 7/2007 | Havens et al. | 235/462.45 |
| 2007/0181692 A1* | 8/2007 | Barkan et al. | 235/462.41 |
| 2007/0278306 A1* | 12/2007 | Brock | G06K 7/10722 |
| | | | 235/462.11 |
| 2007/0295814 A1* | 12/2007 | Tanaka et al. | 235/454 |
| 2008/0011855 A1 | 1/2008 | Nadabar | |
| 2008/0105745 A1* | 5/2008 | Lei | 235/462.1 |
| 2010/0123005 A1* | 5/2010 | Guess | G06K 7/1093 |
| | | | 235/383 |
| 2010/0147948 A1* | 6/2010 | Powell et al. | 235/455 |
| 2010/0213259 A1* | 8/2010 | Gao | 235/469 |
| 2010/0245270 A1* | 9/2010 | Nako | 345/173 |
| 2011/0157089 A1* | 6/2011 | Rainisto | 345/175 |
| 2012/0000982 A1* | 1/2012 | Gao et al. | 235/455 |
| 2012/0067956 A1* | 3/2012 | Gao | G06K 7/1095 |
| | | | 235/455 |
| 2012/0111944 A1* | 5/2012 | Gao | G06K 7/1443 |
| | | | 235/462.01 |
| 2012/0138684 A1* | 6/2012 | Van Volkinburg | G06K 7/1443 |
| | | | 235/455 |
| 2012/0181338 A1* | 7/2012 | Gao | 235/455 |
| 2012/0193429 A1* | 8/2012 | Van Volkinburg | G06K 7/10732 |
| | | | 235/470 |
| 2012/0248184 A1* | 10/2012 | Naito | 235/383 |
| 2013/0062412 A1* | 3/2013 | Tan et al. | 235/455 |
| 2013/0075464 A1* | 3/2013 | Van Horn et al. | 235/375 |
| 2013/0082109 A1* | 4/2013 | Meier et al. | 235/462.41 |
| 2013/0134217 A1* | 5/2013 | Crooks et al. | 235/440 |
| 2013/0181055 A1* | 7/2013 | Liu et al. | 235/462.42 |
| 2014/0131448 A1* | 5/2014 | Xian | G06K 7/10851 |
| | | | 235/470 |
| 2015/0001294 A1* | 1/2015 | Zocca | G06K 7/10544 |
| | | | 235/437 |

FOREIGN PATENT DOCUMENTS

| | | |
|---|---|---|
| CN | 101710407 A | 5/2010 |
| EP | 0574024 A2 | 12/1993 |
| JP | 08-129597 A | 5/1996 |
| JP | 2009-544105 A | 12/2009 |

OTHER PUBLICATIONS

Datalogic™, Magellan™ 3200Vsi On-Counter Vertical Presentation Scanner, Product Reference Guide, Rev. A, Jul. 2010.

Gao et al., U.S. Appl. No. 13/204,627, "System and Method for Reading Optical Codes on Reflective Surfaces While Minimizing Flicker Perception of Pulsed Illumination," filed Aug. 5, 2011.

* cited by examiner

ADAPTIVE DATA READER AND METHOD OF OPERATING

RELATED APPLICATIONS

This application is a nonprovisional of and claims the benefit under 35 U.S.C. §119(e) of U.S. Provisional Patent Application No. 61/412,196, filed Nov. 10, 2010, which is hereby incorporated by reference in its entirety.

BACKGROUND

Optical codes, such as barcodes and other machine-readable indicia, appear in various places in a variety of applications. There are a variety of such optical codes, including 1D or linear barcodes (e.g., UPC code), 2D codes including stacked linear barcodes (e.g., PDF-417 code), and matrix codes (e.g., Datamatrix code, QR code, or Maxicode). Businesses have begun sending electronic versions of optical codes to customers who display such optical codes on a portable electronic device, such as a mobile telephone, personal digital assistant, palm, tablet, or laptop computer, or other suitable device having an electronic display, such as a liquid crystal display (LCD). For example, an airline passenger may display an optical code on a portable electronic device for an airline employee to read using a data reader as verification of the passenger's ticket. In another example, a customer in a store may display an optical code on a portable electronic device for a cashier to read using a data reader to redeem a coupon. Optical codes are also included on other items having highly, or relatively highly, reflective surfaces, for example, but not limited to, identification (ID) cards, aluminum cans, and objects in plastic packaging.

SUMMARY OF THE DISCLOSURE

Methods and systems are disclosed for improved reading of optical codes (or other patterns such as fingerprints or facial features) regardless of whether the optical code is presented on a highly reflective or other surface. Certain embodiments are disclosed directed to data readers and methods of operating that have greater processing or decoding ability for reading optical codes appearing on (or behind) highly, or relatively highly, reflective surfaces.

According to one system/method embodiment, system resources are allocated according to data reader operating modes. In another embodiment, decoding methods change according to data reader operating modes. In one example method, one or more images of an item bearing an optical code are captured and the captured images are analyzed to determine whether the item has a highly, or relatively highly, reflective surface or not. Based on such a determination, in some embodiments, operating parameters, including decode settings, are automatically adjusted by the system to process and decode an optical code. The operating parameters may include one or more of the following: the amount of time dedicated to 1D code decoding and the amount of time dedicated to 2D code decoding, the order in which 1D code and 2D code decoding are performed, termination of a decoding operation, restarting an image capture and decoding operation, image preprocessing, and the intensity of illumination used to illuminated the optical code.

Additional aspects and advantages will be apparent from the following detailed description of embodiments, which proceeds with reference to the accompanying drawings.

DETAILED DESCRIPTION OF EMBODIMENTS

Figure 1:
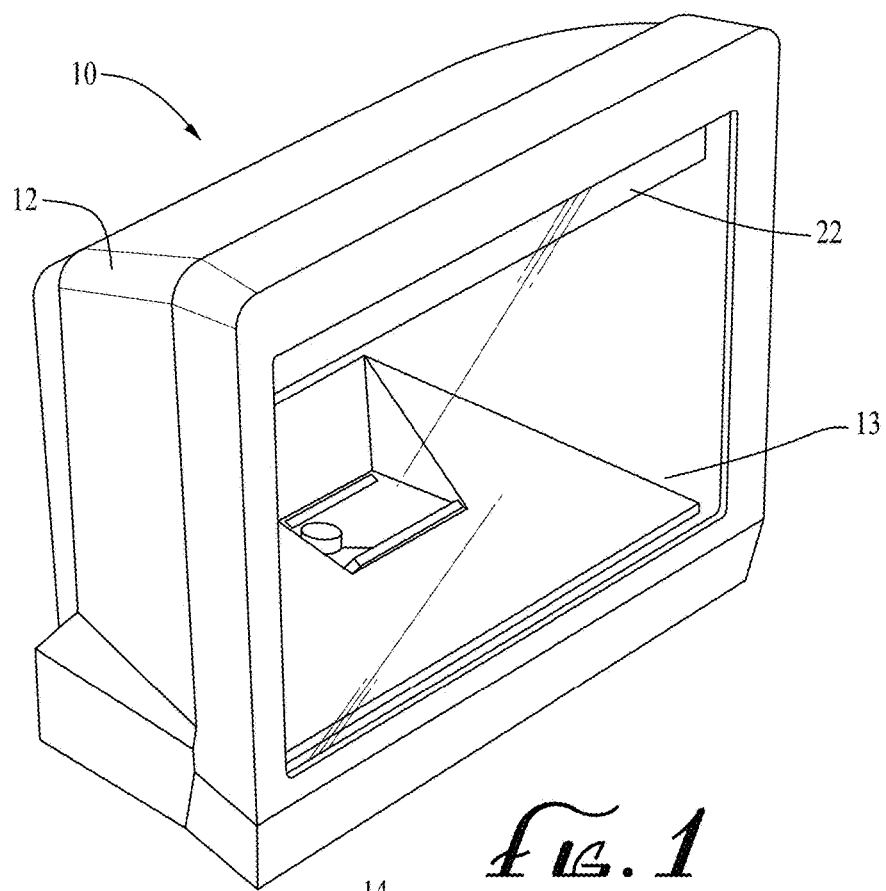
FIG. 1 is an isometric front view of an exemplary data reader.

The described features, structures, characteristics, and methods may be combined in any suitable manner in one or more embodiments. In view of the disclosure herein, skilled persons will recognize that the various embodiments can be practiced without one or more of the specific details or with other methods, components, materials, or the like. In other instances, well-known structures, materials, or operations are not shown or not described in detail to avoid obfuscating other aspects of the embodiments. For convenience, the methods and systems may be described herein with reference to optical codes, however, it is understood that the methods described herein are applicable to any host computer and to any type of optically readable code, such as, but not limited to, those described above, bio-information such as fingerprints, retina patterns, blood vessel patterns, or facial features, and other suitable codes. Thus, data readers can include devices employing laser scanning, imaging, or other suitable techniques.

Features or advantages exhibited by described, or other, embodiments include one or more of decreasing processing time, increasing processing throughput, and increasing decoding accuracy, by automatically revising operating parameters, decode parameters, or other suitable adjustment for a data reader based on determining whether an optical code is borne by a reflective surface.

The present inventors have recognized that optical codes presented on, or under (behind), a highly or relatively highly reflective surface are typically difficult to decode using data readers. For example, general-purpose data readers commonly use artificial illumination to illuminate an object bearing an optical code to create an image of the optical code having sufficient contrast for decoding the optical code. Highly, or relatively highly, reflective surfaces bearing optical codes commonly reflect a large amount of such artificial illumination resulting in a saturated, or partially saturated, image that does not have sufficient contrast for decoding the optical code because all, or portions, of the image appear light, or white.

The present inventors have also recognized that processing or decoding a 2D code typically requires a longer processing time than processing or decoding a 1D optical code. Therefore, according to one example, if the data reader determines the optical code is borne by a non-reflective surface, the decode parameters may be configured or set to spend more processing (i.e., decoding) time attempting to decode 1D codes than attempting to decode 2D codes. If the data reader determines the optical code is borne by a reflective surface, the decode parameters may be configured to spend less time attempting to decode 1D codes than attempting to decode 2D codes.

In addition, the present inventors have recognized that certain highly, or relatively highly reflective surfaces bearing optical codes commonly bear 2D codes, while 1D codes are more likely to appear on non-reflective surfaces. For example, the side of a non-reflective box might be more likely to bear a 1D code, while 2D codes are more likely to appear on or under a reflective surface, such as an electronic display screen. Accordingly, a data reader is disclosed that may capture an image of an optical code borne by a surface. The data reader may analyze the image to determine whether the optical code is borne by a reflective surface or by a non-reflective surface. The data reader may then adjust its operating or decode parameters based on whether the optical code is borne by a reflective or by a non-reflective surface.

In one embodiment, a data reader may capture an image of an optical code borne by a reflective surface using normal operating mode, i.e., a mode including operating parameters optimized for non-reflective surfaces. The data reader may begin processing the optical code to decode it, and at the same time analyze the captured image to determine whether the optical code is borne by a reflective or non-reflective surface. Upon determining that the optical code is borne by a reflective surface and that the image was captured using normal operating parameters, the data reader may determine that a decode attempt is not likely to be successful and terminate the current decode attempt. By adjusting the data reader operating parameters to a reflective mode setting and capturing a new image, the data reader may avoid spending additional time on an unsuccessful decode attempt and therefore decrease the amount of time required to decode the optical code compared to finishing the first decode attempt before adjusting the data reader operating parameters and capturing a new image for decoding.

In some embodiments, the data reader may adjust the operating parameters by determining whether the optical code is borne by a reflective surface with an active light source, i.e., an LCD having a backlight, or by an ordinary reflective surface, i.e., a shiny surface without an active light source. For example, an illumination source on the data reader can be temporarily disabled, reduced in intensity, shifted, or otherwise redirected away from a surface in order to detect whether the surface is emitting light from a backlight. Upon determining the presence of an active light source, the operating parameters may be adjusted to an active light source mode (also referred to as a cell phone mode) that is optimized to obtain images of active light source surfaces, e.g., cell phones displaying optical codes. For example, in a cell phone mode, the data reader may disable an LED illumination source while an imager receives light from a backlight in order to obtain an image of an LCD that reduces specular reflection from the display surface and illumination source.

Figure 1A:
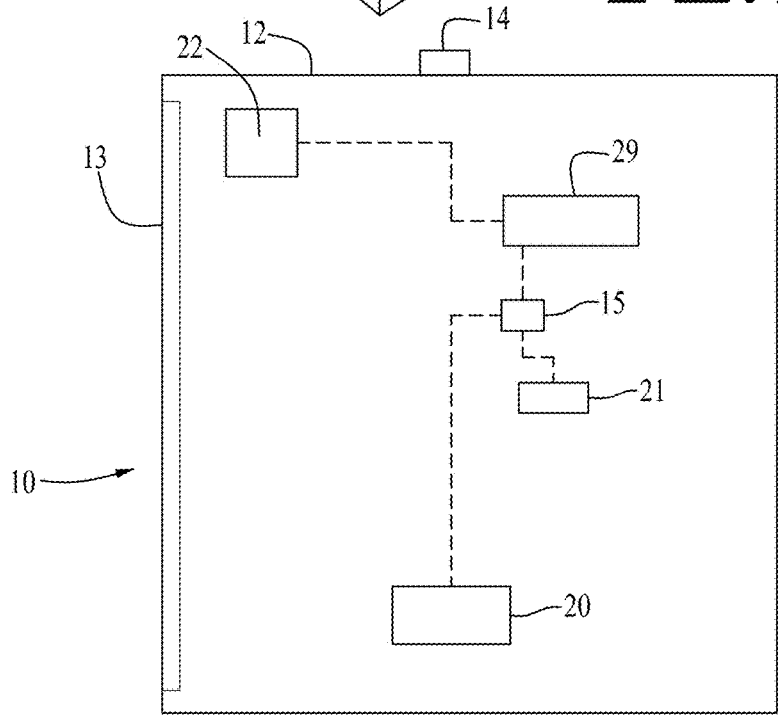
FIG. 1A is a block diagram of an exemplary data reader.
Figure 2A:
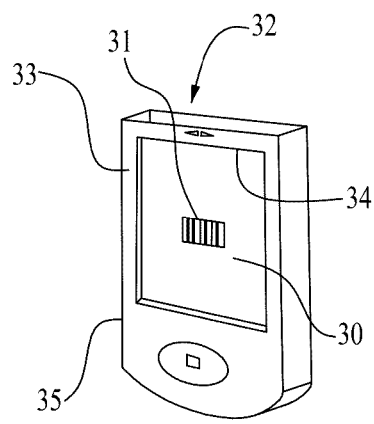
FIGS. 2A, 2B, 2C, and 2D are views of items with each item bearing an optical code.
Figure 2B:
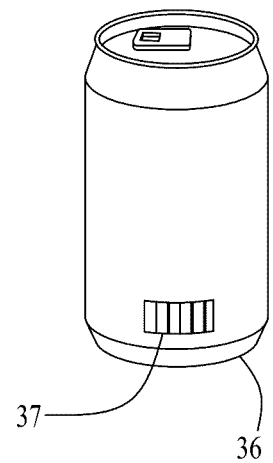
Figure 2C:
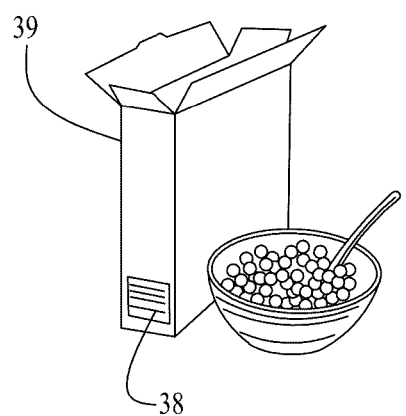
Figure 2D:
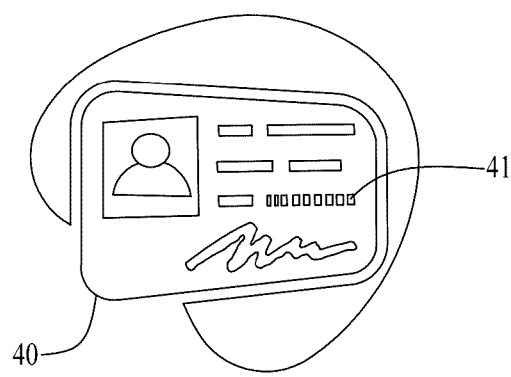

FIG. 1 is a diagrammatic view of a data reader 10 in accordance with a first embodiment. FIG. 1A is a block diagram of the electronics of data reader 10. According to one embodiment, the data reader 10 includes a processor 15 that is programmed to analyze an image scene to determine whether it is advantageous to change one or more operating parameters of the data reader 10. Such image analysis may occur for every frame captured by an imager 20, or alternately, may occur intermittently, for example, image analysis may occur on a periodic basis. A memory 21, such as a flash memory, random access memory, or other suitable memory, communicates with processor 15 to store image data, software, firmware, or other data. In some embodiments, memory 21 may be integrated with processor 15, i.e., as cache memory.

The data reader 10 is illustrated as a scanner suitable for reading optical codes, symbols, or other items. The data reader 10 includes an outer housing 12 to which is attached a window portion 13 which combine for protecting the operative electronics from the outside environment. The data reader 10 may operate as a presentation scanner being self-supported on a horizontal surface or fixed/mounted to a wall or other surface. The data reader 10 is self-supporting (i.e., freestanding) on the outer housing 12 or can be mounted on a stand (not shown) making it usable in a hands free (presentation-type) mode of operation. The data reader 10 may also be grasped about the outer housing 12 and operated in a hand-held or portable mode. In any of a mounted, hands-free, or hand-held mode, data reading may be activated by actuation of a trigger 14 (shown schematically in FIG. 1A), automatically by the processor 15 detecting the presence of an item within a scan volume in front of window 13, or according to a continuous capture and decode mode while data reader 10 is actively scanning, or other suitable process.

The data reader 10 includes an illumination source 22 comprised in this embodiment of light emitting diodes (LEDs) arranged in a line behind window 13. According to some embodiments, the illumination source 22 illuminates an optical code on the item presented to the data reader 10. An optical code, such as optical codes 31, 37, 38, or 41, on an item such as an electronic display screen 30, beverage can 36, cereal box 39, ID card 40 (respectively, FIGS. 2A, 2B, 2C, and 2D), or other suitable item may be read by presenting the item bearing the optical code into a data read volume in front of the window 13.

In some embodiments, the illumination source 22 comprises an array of one or more LEDs, for example, infrared or visible spectrum LEDs, but may alternatively comprise another suitable light source, such as a lamp or laser diode. The illumination source 22 may be coupled to and controlled by the processor 15 or the imager 20, or may be remotely mounted and powered. A power supply circuit 29 is provided for energizing the LEDs.

The imager 20 comprises a complementary metal oxide semiconductor (CMOS) imager. A CMOS imager has a field of view including the read volume within which a target item is presented for imaging. A CMOS imager may comprise an active-pixel imaging sensor with a global shutter, such as a model EV76C560BB CMOS sensor sold by e2v of Saint-Egrève Cedex, France, or may operate on a rolling basis. In some embodiments, a charged couple device (CCD) or other suitable imager may be used. A lens or other optic (not shown) may be used to focus light from the optical code onto the imager 20 array of pixel sensors.

The imager 20, alone or together with logic components such as a complex programmable logic device (CPLD) or a field-programmable gate array (FPGA), is coupled to the processor 15, which, among other functions, is programmed to control image-processing parameters, decoding parameters, or both of the data reader 10 as discussed in detail below. The processor 15 may comprise any suitable digital processor, such as a low-power DSP core or ARM core processor. In some embodiments, processor 15 comprises an ARM9 processor AT91SAM9G20 sold by Atmel of San Jose, Calif., USA, or OMAP processor sold by Texas Instruments of Dallas, Tex., USA or an i.MX1 series processor (such as the MC9328MX1 processor) sold by Freescale Semiconductor, Inc. of Austin, Tex., USA. Alternately, multiple processors or sub-processors or other types of processor electronics such as comparators or other specific function circuits may be used alone or in combination. For the purposes of this description, the term processor is meant to include any of these combinations.

The processor 15 is also programmed to adjust operating parameters to set the data reader 10 into a desired operating mode, e.g., a normal mode or a reflective mode. For example, the data reader 10 is set to a reflective mode when it detects a highly, or relatively highly, reflective surface, and is otherwise set to a normal mode. In exemplary embodiments, the data reader 10 detects a highly, or relatively highly, reflective surface and adjusts operating parameters for the data reader 10 using one or more of the systems/methods described in U.S. patent application Ser. No. 13/204,627, which is fully incorporated herein by reference, and with pertinent aspects described below. Other suitable systems and methods may be used for detecting a highly, or relatively highly, reflective surface and adjusting operating parameters, for example, using a photosensor or using an imager as a photosensor.

As described in U.S. patent application Ser. No. 13/204,627, an array of pixel sensors (such as in the above-mentioned e2v imager) produces an image of a field of view by outputting a signal indicating light intensity values absorbed at the individual pixel sensors. For an 8-bit value imager, the intensity value range is from 0 to 255, with 0 representing a no light or dark body condition (minimum intensity) and 255 representing a saturated condition (maximum intensity). Between those conditions are shades of grayscale values. For example, an imager that captures 8-bit image data that includes a grayscale ranging from 0 to 255, where 0 corresponds to dark pixels, (i.e., pixels receiving no, or almost no light), and 255 corresponds to saturated pixels, (i.e., pixels receiving so much light that a pixel registers a white portion of an image, even when the corresponding part of the item imaged by such a pixel may not be actually white but instead is highly reflective). For a 10-bit value imager, the pixel value ranges from 0 to 1024. The imager also outputs a histogram of how many pixels are of a particular pixel value range. In other embodiments, a histogram can be calculated by using all or part of the pixels of an image for imagers that do not output histogram data.

When attempting to read a barcode displayed by a reflective surface, LCD, or other display screen, there tends to be a large number of pixels with saturated or high intensity values due to the reflective nature of the surface, while at the same time there is a large number of pixels with very low intensity values for the same reasons. By taking a histogram of the output, an image capture showing a certain large threshold number of shiny pixels (i.e., saturated or near saturated) and a relatively large threshold number of dark pixels (i.e., pixels of low intensity) can be determined to represent a reflective surface, e.g., an LCD screen. The system may have these threshold values preset or they may be programmable values, selected by the user or by the technician who selects the values based on the particular establishment lighting conditions or the types of LCD screens being read. In the event the threshold values are exceeded, the processor 15 can then be switched to a reflective mode, or in some embodiments, to an LCD screen reading mode. The following is an example by which a reflective surface can be detected.

Example

Condition 1: a certain number of pixels, for example 100 pixels (or 0.7% of an image) having greater than a given/selected 8-bit high intensity value (example intensity value equals 200 or higher); and Condition 2: a large percentage (example 70%) of pixels are below a low 8-bit intensity value (example intensity value equals 50 or lower). Although these values are for an 8-bit value imager having a range of 0-255, other ranges are possible. If both conditions 1 and 2 above are satisfied (i.e., both the shiny pixel percentage and the dark pixel percentage are above the specific threshold percentage ranges), then it is assumed that a reflective surface been read.

Another way of describing this method of detecting reflective surfaces is by analyzing its associated image histogram to determine whether the histogram is bi-modal, i.e., exhibits two peaks, or more than two peaks. One exemplary manner for analyzing the histogram includes using, or establishing, a low threshold and a high threshold. The low threshold corresponds to a number representing a range of dark, or relatively dark, pixels (low to relatively low grayscale) and the high threshold corresponds to a number representing a range of saturated, or relatively saturated, pixels (high to relatively high grayscale).

In one embodiment for an 8-bit imager, a low threshold may include only pixels registering 0 on the grayscale and a high threshold may include only pixels registering 255 on the grayscale. Alternately, a low threshold may include pixels in a dark-end range on the grayscale, such as 0 to 10, 0 to 20, 0 to 30, 0 to 40, 0 to 50, 0 to 60, or other suitable range, and a high threshold may include pixels in a light-end range on the grayscale, such as 200 to 255, 210 to 255, 220 to 255, 230 to 255, 240 to 255, or other suitable range.

The processor 15 determines whether a first predetermined percentage of pixels fall within the low threshold and whether a second predetermined percentage of pixels fall within the high threshold. For example, the processor 15 obtains or calculates a first number of pixels where each pixel has a grayscale value in the low threshold, such as 0 to 75, for example. The processor 15 also obtains or calculates a second number of pixels where each pixel has a grayscale value in the high threshold, such as 235 to 255, for example. The processor 15 next determines whether the first number of pixels is greater than the first predetermined percentage of pixels and whether the second number of pixels is greater than the second predetermined percentage of pixels. In one embodiment, for an imager having 360,960 pixels (a 752×480 pixel grid), a low threshold of 0 to 75 the first predetermined percentage of pixels is 40% of the imager's total number of pixels and for a high threshold of 230 to 255 the second predetermined percentage of pixels is 8% of the imager's total number of pixels. Other suitable percentages may be used for the same low and high thresholds. Alternately, other suitable percentages, or the same percentages, may be used for other suitable low and high thresholds and for imagers having the same or a different total number of pixels.

The above reflective-surface detection description may be used to detect ordinary reflective (i.e., shiny) surfaces as well as reflective surfaces with active light sources (e.g., backlit LCDs). In addition, ordinary reflective surfaces that are not backlit will simply reflect light and therefore appear less bright compared to active light sources that emit light. Thus, active light sources will typically appear to the imager 20 as relatively saturated (i.e., bright) due to the combination of the backlight and reflected light. Accordingly, in some embodiments, active light sources may be detected and distinguished from ordinary reflective surfaces so that the data reader 10 operating parameters may be adjusted.

For example, when a reflective surface is detected, the illumination source 20 may be adjusted (e.g., deactivated, reduced in intensity, shifted away, or otherwise redirected as to not reflect from the surface) to determine whether there is a backlight producing light that causes an image of the surface to exceed a predetermined brightness or intensity threshold value. Thus, after disabling illumination source 20, a histogram value that exceeds the predetermined threshold value may be used to determine that the reflective surface is an active light source. On the other hand, after disabling illumination source 20, if the reflective surface appears sufficiently dark and does not exceed a threshold, the surface is instead assumed to be a shiny surface and not an active light source. Based on the determination, the operating parameters can then be adjusted to enter, terminate, or otherwise change a data reader operating mode that may include adjusting the intensity of illumination source 20 (e.g., shifting it or disabling it in the case of a detected LCD).

As described above with respect to the reflective-surface detection, the threshold values for detecting an active light source may be predetermined or dynamically configured. According to one embodiment, an active light source can be detected using a grayscale threshold value as described with respect to the following equation:

$$P_{BP}/G >= T \qquad \text{Equation 1}$$

In Equation 1, $P_{BP}$ represents a brightness or intensity value corresponding a predetermined percentile of the brightest pixels of an image, G represents a gain value that is dynamically adjustable such that the observed pixel brightness values are substantially maintained within an predetermined range (e.g., zero to 255), and T represents a threshold value for detecting the active light source.

For example, in one embodiment with approximately 1.3 million pixels, $P_{BP}$ may correspond to the brightest 2% of pixels (2,600 pixels) having a brightness value exceeding, for example, an 8-bit value of 150 (out of 255) while the illumination source 20 is disabled. Assuming G has a value of one and T has an 8-bit value of 128 (out of 255), Equation 1 above would result in 150>128 and therefore indicate that the reflective surface is an active light source, e.g., and LCD.

The values of $P_{BP}$, G, and T may depend on the particular data reader implementation and ambient light conditions. For example, Equation 1 above can be used with or incorporated in a Magellan™ 3300HSi horizontal imager or a Magellan™ 3200VSi vertical imager, both available from Datalogic Scanning, Inc. of Eugene, Oreg., USA, in which case $P_{BP}$ has a brightness value in a range corresponding to a first to a tenth percentile of brightest pixels, G is in a range of one to eight, and T is in a range of 64 to 128 (out of 255).

Figure 3:
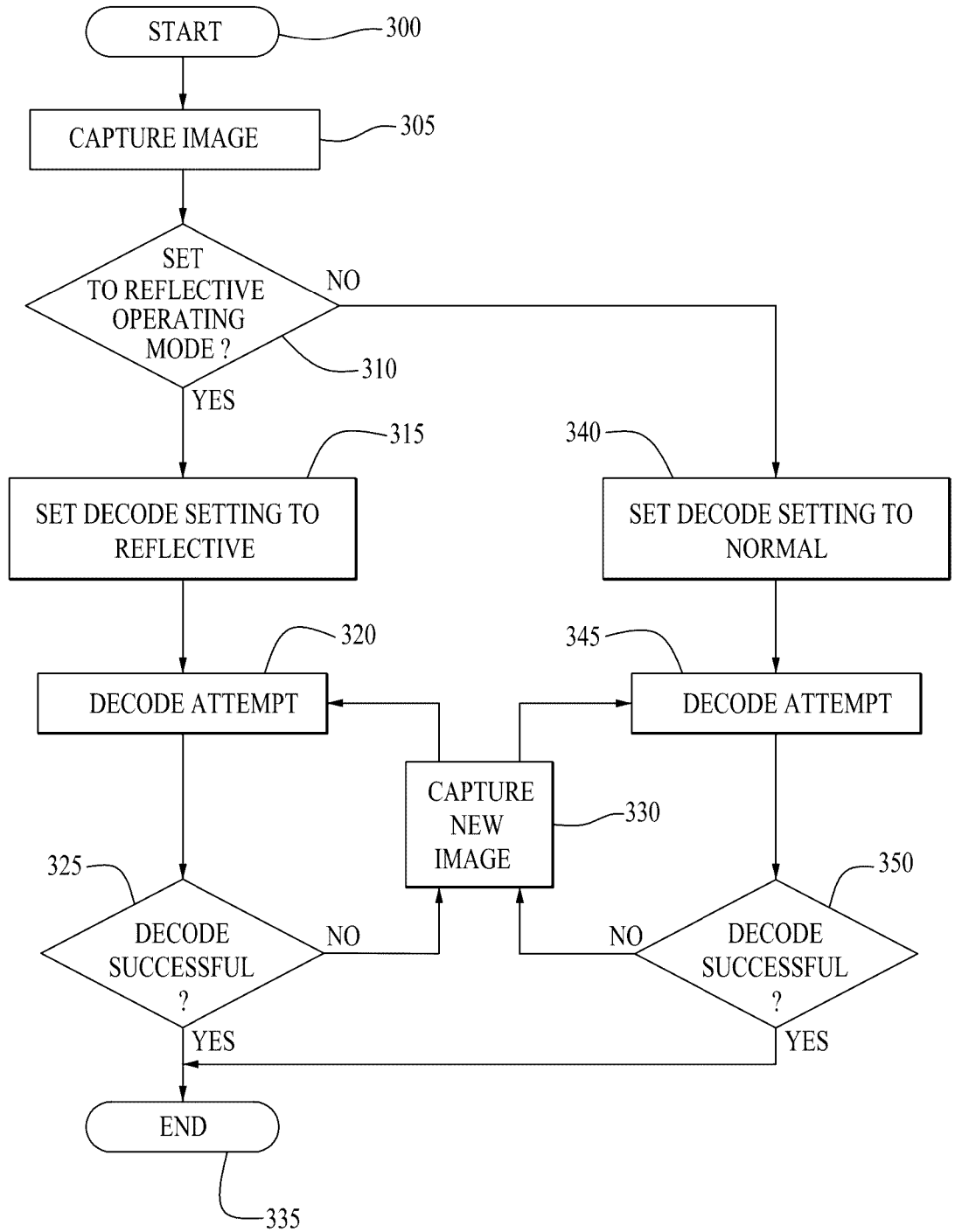
FIG. 3 is a flow chart of a method of operating a data reader to capture, process, and decode an optical code, according to a one embodiment.

FIG. 3 is a flow chart of a method for operating data reader 10 to capture, process, and decode an optical code where modifications to the operation of data reader 10 are made in real-time based on the operating mode of data reader 10. In some embodiments, adjusting the operation of data reader includes adjusting a decode setting to a reflective or normal decode setting that may include adjusting one or more of the following (singularly or in any combination): (1) 1D and 2D decoding times, (2) 1D and 2D decoding order, (3) passing raw image data through a low-pass filter, (4) establishing a signal floor, or (5) establishing a signal ceiling. Systems and methods described herein provide relatively high decode performance under varying environmental conditions, such as varying lighting conditions, for example.

At step 300, in one embodiment, data reader 10 is activated by processor 15 in response to detecting an item, such as electronic device 32, within a read volume. In another embodiment, data reader 10 is activated by optional trigger 14. At step 305, data reader 10 captures a first set of images of the item bearing an optical code, such as optical code 31. The first set of images may include only one image, but may also include two, three, four, five, or more images in other embodiments. For ease of reference, a set of images will be referred to as an image below. Alternately, data reader 10 may continuously be on, i.e., operate or scan continuously.

In one embodiment, data reader 10 is activated upon detecting an object within a read volume and determining that the object is relatively stationary within the read volume for one or more image frames. Determining whether an object is relatively stationary within a read volume may be accomplished in a variety of manners. For example, a pixel-by-pixel grayscale difference for two images may be obtained to create an absolute grayscale difference for the two images. Such an absolute difference is compared against a configurable threshold value, which may be about 15% to about 20%, or other suitable value, to determine whether an object moved from one image to the next. If the difference is lower than the configurable threshold value, then processor 15 determines that an object is relatively stationary.

In one embodiment, data reader 10 uses a set of operating parameters that was used to capture the most recent images of a previous item as an initial set of operating parameters. In other embodiments, data reader 10 uses a predetermined set of operating parameters as an initial set of operating parameters. In other embodiments, data reader 10 may use a predetermined set of operating parameters as an initial set of operating parameters, adjust operating parameters based on image scene analysis as needed, and return to using the predetermined set of operating parameters when presence of an object in the read volume is not detected, or after a timeout occurs for one or more image frames. A predetermined set of operating parameters may be set by the manufacturer and stored in memory 21 communicating with processor 15, for example.

The first image of an item, such as the display screen 30 of an electronic device 32, is analyzed at step 310. Data reader 10 uses processor 15 to determine whether the operating parameters should be set to a reflective mode or to a normal mode, for example, using systems/methods described in U.S. patent application Ser. No. 13/204,627, as discussed above.

If the processor 15 sets data reader 10 to a reflective mode at step 310, then at step 315 the processor 15 automatically adjusts a decode setting to a reflective decode setting. The present inventors have recognized that many reflective surfaces, such as the screen of a mobile telephone or other suitable electronic device, commonly bear 2D optical codes. Therefore, a data reader 10 may operate more efficiently, faster, or both by allocating more time/resources to decoding 2D codes when data reader 10 is in a reflective mode.

Additionally, images captured in a reflective mode may have relatively good contrast, sharpness, or both, which permits processor 12 to decode any 1D codes present in such an image relatively easily or quickly, thus requiring less time/resources devoted to decoding 1D codes.

A decode attempt is typically run for a set period of time, such as 33 milliseconds or other suitable time period. The time period may be fixed, programmably set by the user, or variable as set by external (e.g., sensed) factors. In an embodiment, for a normal decode setting the processor 15 allocates a majority of the decode time period for attempting to decode 1D codes using algorithms designed for 1D code decoding. A remaining, minority portion of the decode time period is allocated for attempting to decode 2D codes using algorithms designed for 2D code decoding. In some embodiments, a normal decode setting includes approximately 20 milliseconds of 1D decoding time followed by approximately 13 milliseconds of 2D decoding time, approximately 23 milliseconds of 1D decoding time followed by approximately 10 milliseconds of 2D decoding time, or other suitable time allocations.

In an embodiment, for a reflective decode setting processor 15 allocates a minority of the decode time period for attempting to decode 1D codes using algorithms designed for 1D code decoding. A remaining, majority portion of the decode time period is allocated for attempting to decode 2D codes using algorithms designed for 2D code decoding. In some embodiments, a normal decode setting includes approximately 6 milliseconds of 1D decoding time followed by approximately 27 milliseconds of 2D decoding time, approximately 8 milliseconds of 1D decoding time followed by approximately 25 milliseconds of 2D decoding time, or other suitable time allocations. In some embodiments, the order in which 1D and 2D decoding are performed may be switched, for example, a reflective decode setting may attempt to decode 2D optical codes first.

At step 320 processor 15 attempts to decode the image containing an optical code using the reflective decode setting. The result of the decode attempt is checked at step 325, and if successful, processing ends at step 335. Otherwise, a new image is captured at step 330 and a subsequent decode attempt is made at step 320. The processing of steps 320, 325 and 330 may be repeated until a successful decode is made or until a predetermined number of iterations has been completed, such as ten image captures and decode attempts, for example, or until a predetermined amount of time has elapsed.

If the processor 15 sets data reader 10 to a normal mode at step 310, then at step 340 the processor 15 automatically adjusts a decode setting to a normal decode setting. At step 345 processor 15 attempts to decode the image containing an optical code using the normal decode setting. The result of the decode attempt is checked at step 350, and if successful, processing ends at step 335. Otherwise, a new image is captured at step 330 and a subsequent decode attempt is made at step 345. The processing of steps 345, 350 and 330 may be repeated until a successful decode is made or until a predetermined number of iterations has been completed, such as ten image captures and decode attempts, for example, or until a predetermined amount of time has elapsed.

In other embodiments, step 330 may be eliminated by instead continuing back at step 305 if a determination is made at step 325 or at step 350 that the decode attempt was not successful.

As described above, active light surfaces may be distinguished from ordinary reflective surfaces. Therefore, in another embodiment, the processor 15 may determine whether a reflective surface is an ordinary reflective surface or an active light source. An ordinary reflective decode setting may be established as in step 315 described above, and instead of the normal mode at step 340, the processor 15 may automatically adjust a decode setting to an active light surface decode setting, i.e., a cell phone mode.

Figure 4:
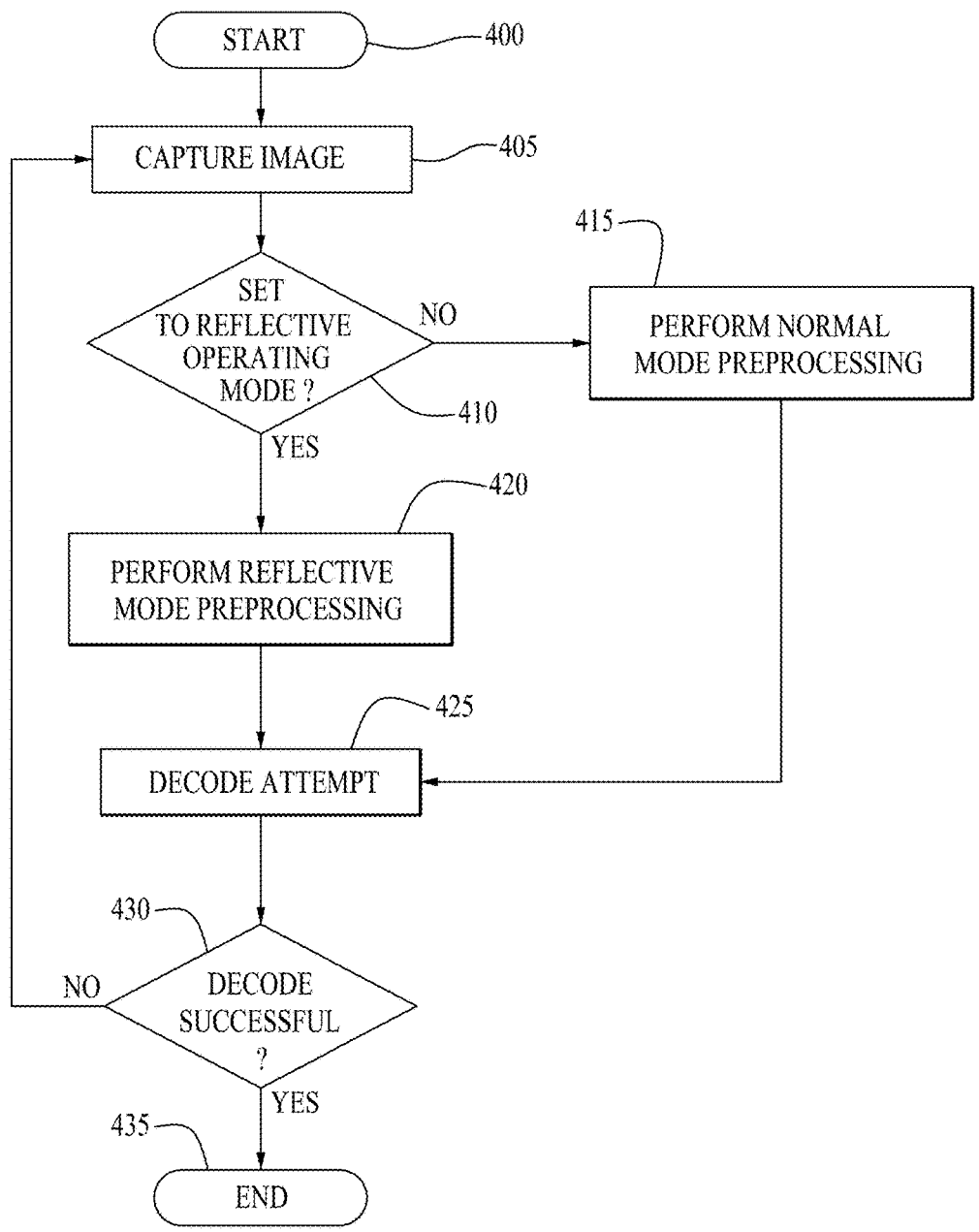
FIG. 4 is a flow chart of a method of operating a data reader to capture, process, and decode an optical code, and includes preprocessing a capture image based on an operating mode, according to one embodiment.

FIG. 4 is a flow chart of another method for operating data reader 10 to capture, process, and decode an optical code that includes preprocessing a captured image based on the operating mode, for example, whether data reader 10 is in a normal or reflective mode. The present inventors have recognized that an image captured from a reflective surface using a normal mode may include an image of an optical code that includes blurred regions, regions of relatively low contrast, specular reflection, or other characteristic that hinders decoding the optical code. The present inventors have also recognized that an image captured from a reflective surface using a reflective mode may include an image of an optical code that includes relatively sharp regions, regions with relatively good contrast, and regions that show gaps between display elements of an electronic display, such as gaps between liquid crystals of an LCD screen, or between the electronic-ink microcapsules of a display manufactured by E Ink Corp. of Cambridge, Mass. In some embodiments, image preprocessing occurs before image data is passed to a decoder for decoding an optical code included in the image.

At step 400, data reader 10 is activated, by processor 15 detecting an item, such as electronic device 32, within a read volume, or by activation of the trigger 14. In other embodiments, the data reader 10 may continuously be on, i.e., operate or scan continuously. At step 405, data reader 10 captures a first image of the item bearing an optical code, such as optical code 31.

The first image of an item, such as the display screen 30 of an electronic device 32, is analyzed at step 410. Data reader 10 uses processor 15 to determine whether the data reader 10 should be set to a reflective mode or to a normal mode, for example, using systems/methods described above with respect to U.S. patent application Ser. No. 13/204,627.

If the processor 15 sets data reader 10 to a reflective mode at step 410, then at step 420 the processor 15 automatically performs a reflective image preprocessing procedure. In an embodiment, reflective image preprocessing includes sending the captured image data through a low-pass filter, such as a Gaussian, median, or other suitable filter, for example, to form an average of two adjacent pixels. Such reflective image preprocessing decreases the sharpness or contrast of the captured image sufficiently to blur, blend, or hide gaps between elements of an electronic display, or otherwise alter the captured image to facilitate decoding an optical code.

Figure 5:
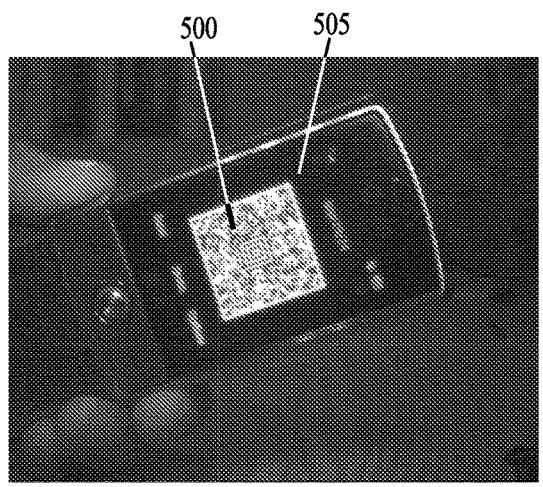
FIG. 5 is an exemplary pictorial view captured by an imaging device, the pictorial view showing a mobile telephone having a display presenting an optical code.
Figure 5A:
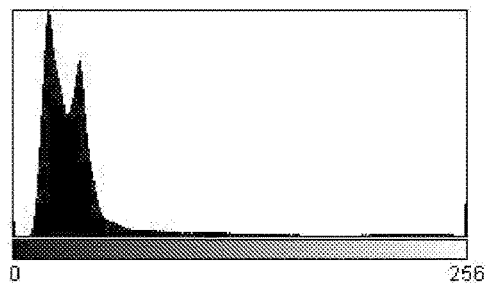
FIG. 5A is an exemplary histogram representing image data corresponding to the pictorial view of FIG. 5.

In another embodiment, reflective image preprocessing may include establishing a signal floor, or an image substrate threshold. For example, for an 8-bit value imager, the grayscale intensity value range for each pixel is from 0 to 255, with 0 representing an un-illuminated or dark body condition (minimum intensity) and 255 representing a saturated condition (maximum intensity). If a raw image is passed to a decoder, the decoder analyzes each pixel to determine its grayscale value (0-255). An exemplary raw image of an optical code 500 captured from an electronic display 505 is illustrated in FIG. 5. Because of the large number of pixels in a typical imager, the decoder may locate a relatively high number of edges (for example as illustrated in the histogram of FIG. 5A) and time out if image processing takes longer than the decode period. However, an image captured from a mobile telephone or other suitable device with an electronic display typically has a relatively good contrast when data reader 10 is in a reflective mode, which permits use of a signal floor, histogram balance, or both to decrease the amount of data a decoder must process.

Figure 6:
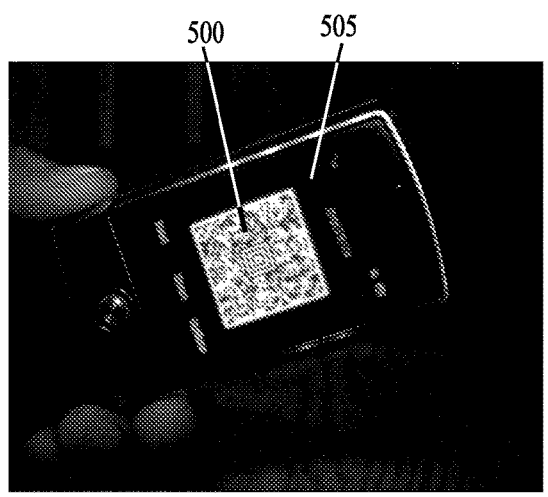
FIG. 6 is another exemplary pictorial view captured by an imaging device, the pictorial view showing a mobile telephone having a display presenting an optical code.
Figure 6A:
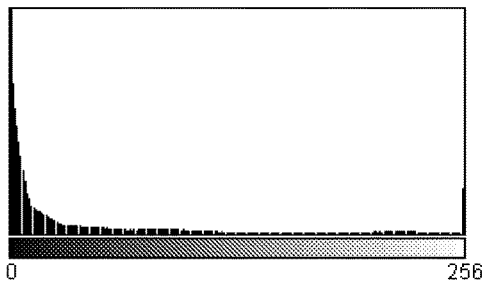
FIG. 6A is an exemplary histogram representing image data corresponding to the pictorial view of FIG. 6.

In one embodiment, a threshold of 40 is established, meaning that for each raw image pixel with a value of 40 or lower the pixel value is set to 0, for example, by applying a grayscale look-up-table to each pixel before passing the pixel value to the decoder. Other suitable floor or threshold values may be used, such as 45, for example, and other suitable techniques for adjusting or modifying pixel values may be used, as long as the modified image retains sufficient contrast and sharpness for decoding an optical code. An exemplary image of the optical code 500 where a signal floor or image substrate threshold has been applied is illustrated in FIG. 6. Such a threshold may decrease the overall image brightness, but maintain sufficient image contrast, sharpness, or both. The modified image includes sufficient contrast and sharpness to result in a decodable image that has less data to be processed by the decoder, thus reducing the likelihood the decoder will time out. As illustrated in the histogram depicted in FIG. 6A, such an image may have relatively fewer edges and require less decoding time.

In other embodiments, reflective image preprocessing may include establishing a signal ceiling. For example, a ceiling of 250 may be established meaning that for each raw image pixel with a value of 250 or higher, the pixel value is set to 250 before being passed to the decoder. Other suitable ceiling values may be used, such as 245, for example, as long as the modified image retains sufficient contrast and sharpness for decoding an optical code.

Processor 15 attempts to decode the preprocessed image at step 425. A determination is made at step 430 to determine whether an optical code was successfully decoded or not. If a successful decode was made, processing ends at step 435. Otherwise, a subsequent image is captured at step 405. The processing of steps 405, 410, 420, 425 and 430 may be repeated until a successful decode is made or until a predetermined number of iterations has been completed, such as ten image captures and decode attempts, for example, or until a predetermined amount of time has elapsed.

If the processor 15 sets data reader 10 to a normal mode at step 410, then at step 415 the processor 15 automatically performs a normal image preprocessing procedure. In an embodiment, normal image preprocessing includes sending the captured image data through a high-pass filter, such as a Sobel, gradient, or other suitable filter. Such normal image preprocessing sharpens features of the captured image, such as the edges of an optical code, improves contrast, or both, or provides other desirable characteristics to facilitate decoding an optical code.

Processor 15 attempts to decode the preprocessed image at step 425. A determination is made at step 430 to determine whether an optical code was successfully decoded or not. If a successful decode was made, processing ends at step 435. Otherwise, a subsequent image is captured at step 405. The processing of steps 405, 410, 415, 425 and 430 may be repeated until a successful decode is made or until a predetermined number of iterations has been completed, such as ten image captures and decode attempts, for example, or until a predetermined amount of time has elapsed.

As described above, active light surfaces may be distinguished from ordinary reflective surfaces. Therefore, in another embodiment, the processor 15 may determine whether a reflective surface is an ordinary reflective surface as in step 410 described above, but instead of performing normal mode preprocessing at step 415, active light source preprocessing may be performed. Active light source preprocessing is substantially similar to reflective image preprocessing discussed above, but may include filter settings, threshold values, or other settings optimized for an electronic display.

Figure 7:
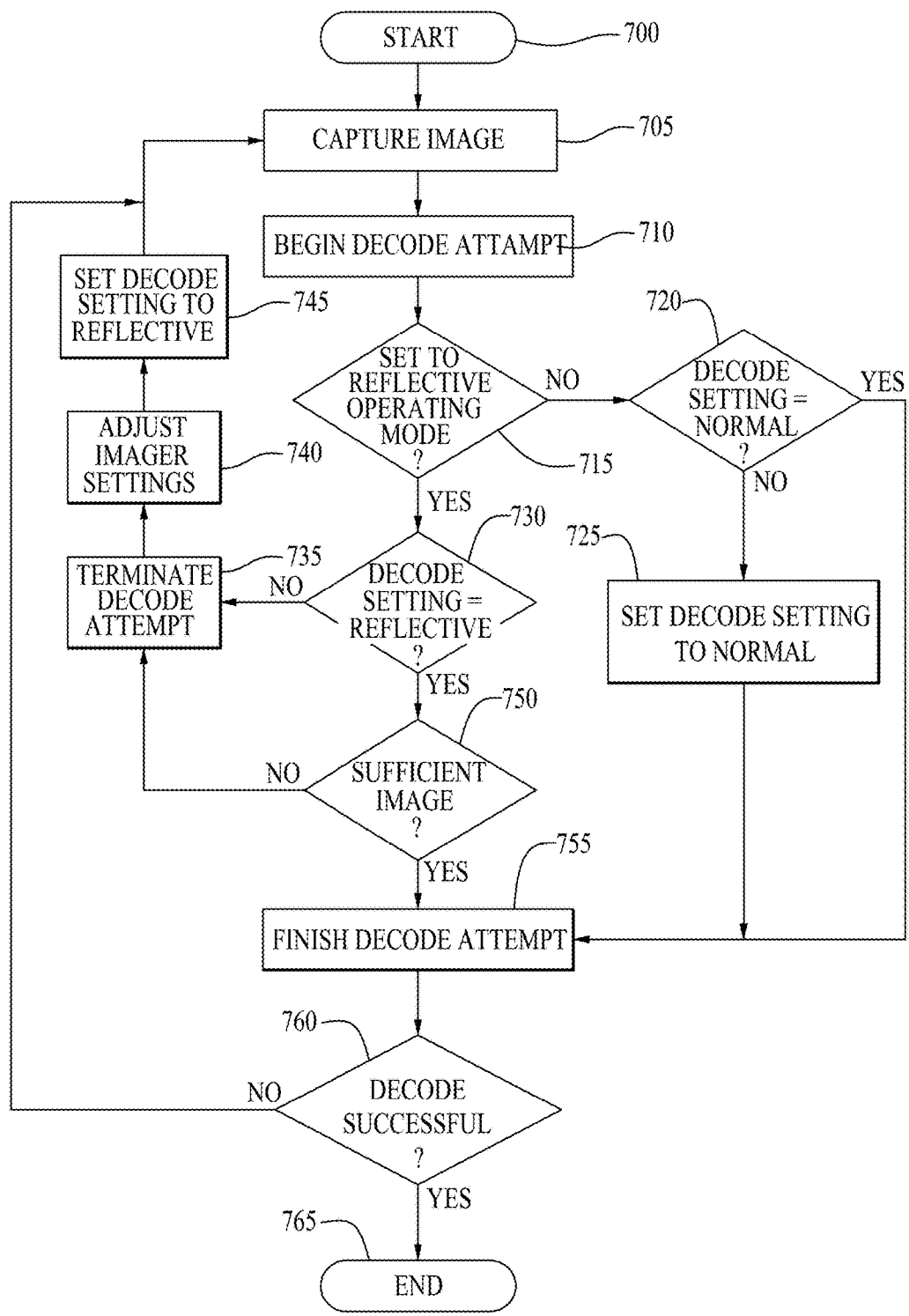
FIG. 7 is a flow chart of a method of operating a data reader to capture, process, and decode an optical code, and includes terminating a decode attempt, according to one embodiment.

FIG. 7 is a flow chart of a method according to another embodiment for operating data reader 10 to capture, process, and decode an optical code that includes terminating a decode attempt, for example, based on a change of the operating mode from a normal mode to a reflective mode. The present inventors have recognized that an image of a mobile telephone display or other suitable electronic device display captured in a normal mode may include an image of a 2D optical code. However, a data reader 10 that begins decoding such an image using normal decode settings may not be able to decode such a 2D code. For example, the decode attempt may time out because a majority of the decode time is allocated to decoding 1D codes, and the remaining time is not sufficient for the relatively more complex 2D algorithms to decode the 2D code. Or, the image may not be sufficiently sharp or have sufficient contrast to be decoded.

Instead of finishing the decode operation, some embodiments may terminate a decode attempt of an image captured in a normal mode when processor 15 determines that data reader 10 should be changed from a normal mode to a reflective mode. Thus, decoding speed may be increased by terminating a decode attempt that is not likely to decode an optical code. Decoding speed may also be increased by relatively quickly adjusting the operating mode and decode settings of data reader 10 before capturing a subsequent image to increase the likelihood of decoding the optical code.

At step 700, data reader 10 is activated, by processor 15 detecting an item, such as electronic device 32, within a read volume, or by activation of an optional trigger 14. At step 705, data reader 10 captures an image of the item bearing an optical code, such as optical code 31. Alternately, data reader 10 may continuously be on, i.e., operate or scan continuously.

Processor 15 begins a decode attempt at step 710. While the decode attempt is running, the processor 15 also determines whether data reader 10 should be set to a reflective mode at step 715, for example, using one or more of the systems/methods described above with respect to U.S. patent application Ser. No. 13/204,627, or other suitable system or method.

If data reader 10 should be set to a reflective mode, for example, based on analysis of a captured image as described above with respect to U.S. patent application Ser. No. 13/204,627, or other suitable system or method, processor 15 checks to determine whether the decode setting is set to a reflective decode setting at step 730. If the decode setting is not set to a reflective decode setting, processor 15 assumes the currently captured image was captured using a normal mode and terminates the decode attempt at step 735. At step 740, processor 15 adjusts imager settings to accommodate capturing images of reflective surfaces, for example, as described above with respect to U.S. patent application Ser. No. 13/204,627, or other suitable method.

The decode setting is set to a reflective decode setting at step 745, for example, as described above with reference to FIG. 3. A subsequent image is captured at step 705 and a decode attempt of the subsequent image is undertaken at step 710. At step 715 processor 15 again determines that data reader 10 should be in a reflective mode and determines that the decode setting is established as a reflective decode setting at step 730.

Processing proceeds to step 750 where processor 15 determines whether the captured image is sufficient for decoding. For example, processor 15 determines whether the captured image is sufficiently sharp, has sufficient contrast, or both using systems or methods described above with respect to U.S. patent application Ser. No. 13/204,627, or other suitable systems or methods. If processor 15 determines the image is not sufficient for decoding, the decode attempt is terminated at step 735 and processing continues via steps 740, 745, 705, 710, 715, 730, and 750 as described above.

If processor 15 determines the image is sufficient for decoding, the decoding attempt is finished at step 755. Processor 15 determines whether a successful decode was made at step 760, and if so, processing ends at step 765. Otherwise, processing continues via steps 705, 710, 715, 730, 750, 755, and 760 as described above. The processing of steps 705, 710, 715, 730, 750, 755, and 760 may be repeated until a successful decode is made or until a predetermined number of iterations has been completed, such as ten image captures and decode attempts, for example, or until a predetermined amount of time has elapsed.

If, at step 715 processor 15 determines data reader 10 should be set to a normal mode, processor 15 checks to determine whether the decode setting is set to a normal decode setting at step 720. If the decode setting is not set to a normal decode setting, processor 15 sets the decode setting to a normal decode setting at step 725 and the decode attempt is finished at step 755. Processing continues either via steps 760 and 765, or via steps 760, 705, 710, 715, 720, 725, and 755 substantially as described above.

Although the example depicted in FIG. 7 pertains to terminating a decode attempt based on a change in the decode settings, in another embodiment, the processor 15 may terminate a decode based on determining a reflective surface is an ordinary reflective surface instead of an active light source (or vice versa). In other words, a cell phone mode decode attempt may be terminated and the data reader 10 switched to a standard reflective mode.

While certain systems and methods have been shown and described, it will be apparent to skilled persons that modifications, alternatives and variations are possible without departing from the concepts set forth herein. For example, preprocessing steps, such as those illustrated and described with respect to FIG. 4, may be added to processing steps, such as those illustrated and described with respect to FIG. 3 or 7. For example, with respect to FIG. 7, steps similar to steps 415 and 420 may be included between steps 705 and 710, and implementation of steps similar to steps 415 and 420 may be based on the current operating mode, or other suitable parameter of a data reader, such as data reader 10. Therefore, the invention is intended to embrace all suitable modifications, alternatives, and variations. Thus, the scope of the invention should be determined only by the following claims.

The invention claimed is:

1. A method for data reading, comprising:
    capturing, via a data reader, an image of an item bearing an optical code;
    analyzing a distribution of pixels' intensities of the image to determine whether the optical code is borne by a reflective surface;
    establishing a decode setting based on whether the optical code is borne by a reflective surface by configuring the decode setting to use a minority of a total decoding time of the optical code for decoding a 1D optical code and a majority of the total decoding time for decoding a 2D optical code if it is determined that the optical code is borne by a reflective surface and configuring the decode setting to use a minority of the total decoding time for decoding a 2D optical code and a majority of the total decoding time for decoding a 1D optical code if it is determined that the optical code is not borne by a reflective surface; and
    decoding the optical code appearing in the image using the configured decode setting.

2. A method according to claim 1 wherein the capturing includes capturing, via the data reader, the image of the item comprising an electronic display surface displaying the optical code.

3. A method for data reading, comprising:
    capturing, via a data reader, an image of an item bearing an optical code;
    analyzing a distribution of pixels' intensities of the image to determine whether the optical code is borne by a reflective surface;
    establishing a decode setting based on whether the optical code is borne by a reflective surface by configuring the decode setting to first attempt to decode a 1D optical code using a majority of a total decoding time of the optical code prior to attempting to decode a 2D optical code using a minority of the total decoding time of the optical code if it is determined that the optical code is not borne by a reflective surface and configuring the decode setting to use a minority of the total decoding time for decoding a 1D optical code and a majority of the total decoding time for decoding a 2D optical code if it is determined that the optical code is borne by a reflective surface; and
    decoding the optical code appearing in the image using the configured decode setting.

4. A method according to claim 1 wherein the establishing the decode setting includes:
    configuring the decode setting to first attempt to decode a 2D optical code prior to attempting to decode a 1D optical code if it is determined that the optical code is borne by a reflective surface.

5. A method according to claim 1 further comprising:
    preprocessing the image according to a preprocessing procedure, wherein the preprocessing procedure is different when the optical code is borne by a reflective surface compared to when the optical code is not borne by a reflective surface.

6. A method according to claim 5 wherein the preprocessing the image includes:
    passing image data from the image through a high-pass filter if it is determined that the optical code is not borne by a reflective surface.

7. A method according to claim 5 wherein the preprocessing the image includes:
    passing image data from the image through a low-pass filter if it is determined that the optical code is borne by a reflective surface.

8. A method according to claim 5 wherein the preprocessing the image includes:
    if it is determined that the optical code is borne by a reflective surface, comparing pixel values to a predetermined threshold; and
    for pixel values equal to or less than the predetermined threshold, setting the pixel values to a predetermined value.

9. A method according to claim 5 wherein the preprocessing the image includes:
if it is determined that the optical code is borne by a reflective surface, comparing pixel values to a predetermined threshold; and
for pixel values equal to or greater than the predetermined threshold, setting the pixel values to a predetermined value.

10. A non-transitory computer-readable medium comprising instructions thereon, which when executed by a computer, perform the steps of:
capturing, via a data reader, an image of an item bearing an optical code;
analyzing a distribution of pixels' intensities of the image to determine whether the optical code is borne by a reflective surface;
establishing a decode setting based on whether the optical code is borne by a reflective surface by configuring the decode setting to first attempt to decode a 2D optical code using a majority of a total decoding time of the optical code prior to attempting to decode a 1D optical code using a minority of the total decoding time if it is determined that the optical code is borne by a reflective surface and establishing the decode setting to use a minority of the total decoding time for decoding a 2D optical code and a majority of the total decoding time for decoding a 1D optical code if it is determined that the optical code is borne by a non-reflective surface; and
decoding the optical code appearing in the image using the configured decode setting.

11. A system for data reading comprising:
an imager configured to capture an image of an item bearing an optical code;
an illumination source configured to illuminate the item; and
a controller configured to operate the imager and the illumination source, wherein the controller is programmed to:
initiate a capture of an image of the item bearing the optical code;
analyze a distribution of pixels' intensities of the image to determine whether the optical code is borne by a reflective surface;
preprocess the image according to a preprocessing procedure, wherein the preprocessing procedure is different when the optical code is borne by a reflective surface compared to when the optical code is not borne by a reflective surface;
establish a decode setting based on whether the optical code is borne by a reflective surface by configuring the decode setting to use a minority of a total decoding time for decoding a 1D optical code and a majority of the total decoding time for decoding a 2D optical code if it is determined that the optical code is borne by a reflective surface and configuring the decode setting to use a minority of the total decoding time for decoding a 2D optical code and a majority of the total decoding time for decoding a 1D optical code if it is determined that the optical code is not borne by a reflective surface; and
decode the optical code appearing in the image using the configured decode setting.

12. A system for data reading according to claim 11, wherein the controller is further programmed to:
configure the decode setting to attempt to decode a 1D optical code prior to attempting to decode a 2D optical code if the optical code is not borne by a reflective surface.

13. A system for data reading according to claim 11, wherein the controller is further programmed to:
configure the decode setting to attempt decoding of a 2D optical code prior to attempting to decode a 1D optical code if the optical code is borne by a reflective surface.

14. A system for data reading according to claim 11, wherein the controller is further programmed to:
pass image data from the image through a high-pass filter if the optical code is not borne by a reflective surface; and
pass image data from the image through a low-pass filter if the optical code is borne by a reflective surface.

15. A system for data reading according to claim 11, wherein the controller is further programmed to:
compare pixel values to a first predetermined threshold and a second predetermined threshold;
modify the pixel values to a first predetermined value for pixel values equal to or less than the first predetermined threshold; and
modify the pixel values to a second predetermined value for pixel values equal to or greater than the second predetermined threshold.

16. A system for data reading according to claim 11, wherein the controller is further programmed to:
terminate a decode operation in response to determining the optical code is borne by a reflective surface and the image was captured using a normal operating mode.

17. A system for data reading according to claim 11, wherein the controller is further programmed to:
terminate a decode operation in response to determining the optical code is not borne by a reflective surface and the image was captured using a reflective operating mode.

18. A method according to claim 1 wherein the establishing of the decode setting comprises causing the data reader to change from a first decoding routine to a second decoding routine that is different than the first decoding routine, wherein the change from the first decoding routine to the second decoding routine does not alter image capture parameters.

19. A system according to claim 11 wherein, in response to establishing the decode setting, the data reader changes from a first decoding routine to a second routine process that is different than the first decoding routine, wherein the change from the first decoding routine to the second decoding routine does not alter image capture parameters.

* * * * *